US007890400B2

(12) United States Patent
Burakoff et al.

(10) Patent No.: US 7,890,400 B2
(45) Date of Patent: Feb. 15, 2011

(54) OBTAINING CONSENT FOR ELECTRONIC DELIVERY OF COMPLIANCE INFORMATION

(76) Inventors: Stephen V. Burakoff, 137 Monadnock Rd., Chestnut Hill, MA (US) 02167; Sergiu S. Simmel, 36 Kilsyth Rd., No. 1, Brookline, MA (US) 02146; Robert A. Fein, 114 Greenlawn Ave., Newton, MA (US) 02159

( * ) Notice: Subject to any disclaimer, the term of this patent is extended or adjusted under 35 U.S.C. 154(b) by 82 days.

(21) Appl. No.: 11/804,942

(22) Filed: May 21, 2007

(65) Prior Publication Data

US 2007/0226109 A1 Sep. 27, 2007

Related U.S. Application Data

(60) Division of application No. 10/035,966, filed on Nov. 9, 2001, which is a continuation of application No. 09/023,039, filed on Feb. 12, 1998, now Pat. No. 6,782,506.

(51) Int. Cl.
*G06Q 40/00* (2006.01)
(52) U.S. Cl. .................. 705/35; 705/36 R; 705/37; 705/38; 705/44; 705/317; 715/752; 715/753
(58) Field of Classification Search .................. 705/35, 705/17
See application file for complete search history.

(56) References Cited

U.S. PATENT DOCUMENTS

| | | | |
|---|---|---|---|
| 5,270,922 A | 12/1993 | Higgins | |
| 5,315,634 A | 5/1994 | Tanaka et al. | |
| 5,457,746 A | 10/1995 | Dolphin | |
| 5,502,637 A | 3/1996 | Beaulieu et al. | |
| 5,513,126 A | 4/1996 | Harkins et al. | |
| 5,590,325 A | 12/1996 | Kolton et al. | |
| 5,689,650 A | 11/1997 | McClelland et al. | |
| 5,790,790 A | 8/1998 | Smith et al. | |

(Continued)

FOREIGN PATENT DOCUMENTS

WO    WO 96/18963 A1    6/1996

(Continued)

OTHER PUBLICATIONS

Bolton, D.W. et al. "Receipt of Solicited and Unsolicited Documents in a Distributed Communication System. Oct. 1980." IBM Technical Disclosure Bulletin, vol. 23, No. 5, Oct. 1980, pp. 2129-2134, pp. 1-6.

(Continued)

*Primary Examiner*—Kirsten S Apple
(74) *Attorney, Agent, or Firm*—Greenberg Traurig, LLP

(57) ABSTRACT

A method and related system obtains consent from an individual for computer-aided delivery of compliance information. Initially, a computer-readable data storage device is provided to the individual. The device stores the compliance information and computer-executable instructions. By inserting the device into a computer, the instructions are executed and the individual is prompted by the computer to consent to the computer-aided delivery of additional compliance information. Once consent is indicated, it is communicated from the individual's computer to another computer such as a server over, for example, a modem connection. Having secured the individual's consent, the additional compliance information can be delivered to the individual's computer as, for example, a file attachment to an email message.

3 Claims, 3 Drawing Sheets

U.S. PATENT DOCUMENTS

| | | | |
|---|---|---|---|
| 5,819,271 | A | 10/1998 | Mahoney et al. |
| 5,864,871 | A | 1/1999 | Kitain et al. |
| 5,893,079 | A | 4/1999 | Cwenar |
| 5,918,218 | A | 6/1999 | Harris et al. |
| 5,926,792 | A | 7/1999 | Koppes et al. |
| 6,122,635 | A | 9/2000 | Burakoff et al. |
| 6,192,407 | B1 * | 2/2001 | Smith et al. ............. 709/229 |
| 6,782,506 | B1 | 8/2004 | Burakoff et al. |
| 7,028,190 | B2 | 4/2006 | Burakoff et al. |
| 7,363,489 | B2 | 4/2008 | Burakoff et al. |

FOREIGN PATENT DOCUMENTS

| | | |
|---|---|---|
| WO | WO 97/15018 A1 | 4/1997 |
| WO | WO 98/07085 A1 | 2/1998 |
| WO | WO 98/26386 A1 | 6/1998 |
| WO | WO 98/33131 A1 | 7/1998 |
| WO | WO 99/22327 A1 | 5/1999 |
| WO | WO 99/41688 A1 | 8/1999 |
| WO | WO 99/41689 A1 | 8/1999 |

OTHER PUBLICATIONS

Electronic Data Gathering, Analysis, and Retrieval (EDGAR)—EDGAR Filer Manual: Guide for Electronic Filing with the U.S. Securities and Exchange Commission by U.S. Securities and Exchange Commission, Washington, D.C., Edgar Release 5.30, Aug. 1997.

"Filing EDGAR—Reference Guide for EDGAR Filers" by RR Donnelley Financial, Jan. 1997, pp. 3-30, Appendix A, Appendix B, Appendix C and Appendix D.

InUnity Corporation Web Site (www.inunity.com), 19 pages printed on Jan. 21, 1998.

InUnity Corporation's Products and Services, 11 pp, Sep. 1997.

InUnity Corporation's Corporate Overview, 12 pp, May 1997.

"The Fund Profile—A White Paper" by Robert A. Fein of InUnity Corporation, 13 pp, Apr. 1997.

CUSIP Web Site (www.cusip.com), 13 pages printed on Feb. 7, 1998.

Information on ReliaStar Life Insurance Company's Select*Life products including packaging dated Sep. 1997 for Shipping a 3.5 inch computer diskette containing InUnity Corporation's technology (4 pages), and including an article dated Nov. 24,1997 that announces the availability of digital prospectuses for the Select*Life products and that identifies InUnity Corporation as the developer of the technology (2 pp).

PricewaterhouseCoopers Technology Centre, EdgarScan, An Intelligent Interface to the SEC EDGAR Database, 1999 PricewaterhouseCoopers, 2 pp.

Edgarscan Beta Release (fwd), Sep. 8, 1996, 2 pp.

"LLRX-A Comparison of SEC Filing Sources," (www.llrx.com/features/sec.htm), May 22, 1997, 5 pp.

Ferguson, D., "Parsing Financial Statements Efficiently and Accurately Using C and Prolog", Proceedings of the Fifth International Conference on the Practical Application of Prolog, Proceedings FO PAP97. Practical Application of Prolog. Fifth International Conference London, UK, Apr. 22-24, 1997, pp. 157-167.

Electronic Signatures in Global and National Commerce Act, One Hundred Sixth Congress of the United States of America, Second Session. Washington, D.C. Jan. 24, 2000. S.761. 14 pages. Accessed May 29, 2009.

Use of Electronic Media for Delivery Purposes. Securities and Exchange Commission, 17 C.F.R. Parts 231, 241 and 271. Release No. 33-7233; 34-36345; IC-21399. 29 pages.

* cited by examiner

OBTAINING CONSENT FOR ELECTRONIC DELIVERY OF COMPLIANCE INFORMATION

RELATED APPLICATIONS

This application is a divisional of U.S. application Ser. No. 10/035,966, filed Nov. 9, 2001, now pending, which is a continuation of U.S. application Ser. No. 09/023,039, filed Feb. 12, 1998, now U.S. Pat. No. 6,782,506, issued Aug. 24, 2004, the disclosures of which are incorporated by reference herein.

TECHNICAL FIELD

This invention relates to obtaining consent from an individual to the electronic delivery of financial information such as that required by the Securities and Exchange Commission (e.g., a "sticker update" to a mutual fund prospectus already in the possession of the individual).

BACKGROUND INFORMATION

The Securities and Exchange Commission (SEC) requires that certain individuals such as prospective and existing investors be delivered certain information about investment vehicles such as mutual funds. In the context of a prospective investor in a particular mutual fund, for example, a mutual fund prospectus must be delivered to the prospective investor in such a way that it provides the prospective investor with notice and access. The delivery requirement can be met by sending the prospectus to the prospective investor via the U.S. Postal Service.

Delivering paper prospectuses and hard copies of other SEC-required documents (e.g., "sticker updates" to mutual fund prospectuses) to prospective and existing investors is a time consuming and costly endeavor for investment companies. Printing and mailing costs alone can amount to thousands or millions of dollars per year for a single mutual fund.

The SEC has indicated that mutual fund prospectus documents can be distributed in electronic format with the caveat that any electronic delivery must meet at least the SEC's notice, access, and evidence of delivery requirements.

SUMMARY

In accordance with the invention, the physical delivery of electronic media containing SEC-required information (e.g., a computer-readable diskette that is sent to a person via the U.S. Postal Service and that contains in electronic digital format a mutual fund prospectus) can be used as a mechanism to establish electronic delivery of additional SEC-required information (e.g., a "sticker update" to the prospectus the person just received on the diskette) or to obtain the receiver's consent to the electronic delivery of a notification about additional SEC-required information. Such information can be called compliance information.

As used herein, the term "compliance information" is intended to mean any information or data that is required or suggested by the Securities and Exchange Commission (SEC), or similar state or national entity or entities in the U.S. or abroad (e.g., the National Association of Securities Dealers (NASD), state securities commissioners, and state insurance commissioners), to be filed or to be provided to certain individuals such as prospective and existing investors in mutual funds. Examples of documents containing compliance information include mutual fund prospectuses, updates to mutual fund prospectuses (commonly referred to in the industry as "stickers" or "sticker updates"), annual and semi-annual reports for mutual funds, Statements of Additional Information (SAIs) for mutual funds, preliminary prospectuses ("red herrings"), and final prospectuses. Other examples are disclosure documents for variable insurance products such as variable annuities. Still other examples are disclosure documents for any of a variety of other investment vehicles offered by essentially any entity including, for example, a mutual fund issuer, a corporation, a partnership, an investment company, etc. These types of documents can be called "compliance documents" or "regulated financial information documents" (RFIDs), and the compliance information contained in such documents generally includes financial, performance, and/or other disclosure information that the SEC (or similar state or national entity or entities in the U.S. or abroad) has determined should be regulated in some fashion such that, for example, certain individuals are provided with sufficient material to make a reasoned and informed decision about whether to invest or continue to invest money in the investment vehicle described in the RFID.

In a disclosed embodiment according to the invention, a computer-readable diskette or other physical electronic media is sent to a prospective investor through the mails using, for example, the U.S. Postal Service as the carrier or it is delivered to the prospective investor by hand. The diskette contains, in electronic digital format, a mutual fund prospectus. The prospective investor then inserts the diskette into a computer and, using one of a variety of possible text editors, word processors, or browsers, is able to display and read the prospectus on the computer monitor. The computer prompts the prospective investor in some fashion to respond to a request for consent to the electronic delivery of at least one additional compliance document or to the electronic delivery of a notification of the existence of at least one additional compliance document that the person agrees to obtain and review. Having secured the individual's consent, the software on the diskette and/or the computer then electronically communicates (e.g., via a network connection, a modem, etc.) that consent to some other computer for logging. That other computer could be a server maintained by, for example, the issuer of the mutual fund or an independent service. Depending on the specific consent requested and given, the individual might then sometime in the future receive by electronic mail ("email") an update to the mutual fund prospectus ("sticker") provided on the diskette, or the individual could receive a notification by email that a particular site on the World Wide Web has posted the mutual fund sticker and that the individual should view the sticker at that site by a certain date. The electronic connection is a computer communications link that can be made in a variety of ways including a direct dial-up connection, a private or public network connection, etc. The physical delivery of the diskette to the prospective investor thus is used as a mechanism to obtain consent from the prospective investor for future electronic delivery of additional compliance information.

In one aspect, the invention involves a method and related system for obtaining consent for computer-aided delivery of compliance information. The method and related system provide an individual at a first computer (e.g., a PC owned or used by the individual) with compliance information. The compliance information is provided in such a format that the individual can use the first computer to review it. The first computer also is used to prompt the individual to consent to the computer-aided delivery of additional compliance information. Having obtained the consent, the first computer electronically communicates the individual's consent from the first computer to a second computer (e.g., a server). The second computer can store the communicated consent and/or forward it to a third computer.

In some embodiments of this aspect of the invention, the individual is provided with the compliance information by forwarding to the individual a computer-readable data storage device (e.g., a 3.5 inch computer diskette or a CD ROM) that contains the compliance information as well as computer-executable instructions that prompt the individual for the consent. In other embodiments, the individual is provided with the compliance information in another manner such as by download to the first computer from a source on the Internet. Regardless of the manner in which the compliance information is provided to or obtained by the individual, after the individual's consent is obtained and communicated to the second computer, the additional compliance information is delivered to the first computer. This delivery of the additional compliance information can occur immediately upon receipt of the consent by the second computer or it can happen at a later time, and it can be a delivery from the second computer or some other computer. Also, instead of delivering the additional compliance information to the first computer, a notification about the additional compliance information can be delivered to the first computer such as an email message sent to the first computer that identifies the existence and location of the additional compliance information thereby notifying the individual to, for example, visit a particular site on the World Wide Web section of the Internet to view the additional compliance information. Whether it is the actual additional compliance information or a notification thereof that is delivered to the first computer pursuant to the individual's consent, the delivery is accomplished electronically. That is, the delivery is over a computer communications link (e.g., a modem connection utilizing telephone lines, a network connection utilizing the Internet or some other computer network, etc.). As an example, the electronic delivery can take the form of a file attachment to an email message.

Also, in some embodiments according to this aspect of the invention, the compliance information is contained in a mutual fund prospectus, and the additional compliance information comprises one or more additions or changes ("stickers") to that mutual fund prospectus or an additional RFID. The compliance information and the additional compliance information can be contained in the a variety of other types of compliance documents including, but not limited to, mutual fund annual reports, mutual fund semi-annual reports, replacement mutual fund prospectuses, mutual fund Statements of Additional Information (SAIs), etc.

In another aspect, the invention relates to a manufacture comprising a computer-readable data storage device. The device stores compliance information and computer-executable instructions. The instructions execute on a first computer to cause the first computer to prompt an individual using the first computer to consent to computer-aided delivery of additional compliance information. The instructions also execute on the first computer to cause the first computer to obtain the individual's consent and then communicate that consent from the first computer to a second computer.

Embodiments in accordance with this other aspect of the invention can include the following features. The instructions stored by the device also can execute on the first computer to cause the first computer to display the additional compliance information after the additional compliance information is received at the first computer. The compliance information can comprise a mutual fund prospectus, and the additional compliance information can comprise one or more additions or changes to the mutual fund prospectus.

In one embodiment a method for obtaining consent for computer-aided delivery of compliance information is offered, the method comprising: electronically providing computer-executable instructions for obtaining consent from an individual for subsequent computer-aided delivery of additional compliance information to the individual; prompting, by execution of the instructions on a first computer, the individual for consent to the subsequent computer-aided delivery of the additional compliance information to the individual; communicating the individual's consent from the first computer to a second computer, the second computer connected to the first computer over a network; and transmitting additional compliance information from the second computer to the first computer. In a further embodiment the computer-executable instructions includes instructions for providing a first set of compliance information to the individual.

Another embodiment offers a system for obtaining consent from a user for computer-aided delivery of compliance information, the system comprising: a sending computer arrangement programmed to send software to a user device, the software comprising computer executable instructions; and the user device programmed to: execute the computer executable instructions, prompt the user to consent to the computer aided delivery of compliance information, and communicate the consent to a second device. In a further embodiment the second device is the sending computer arrangement. In another embodiment the software is sent in a message over a network. In still a further embodiment the computer executable instructions allow the user to consent by replying to the message. In still a further embodiment the computer executable instructions allow the user to consent by following a link in the message. In still a further embodiment the computer executable instructions allow the user to consent by executing a form included in the message. In still a further embodiment the sending computer arrangement is further programmed to send compliance information to the user device. In still a further embodiment the sending computer arrangement is further programmed to send a notification about the compliance information to the user device. In still a further embodiment the notification comprises a message sent over a network. In still a further embodiment the notification contains a link to a location of the compliance information. In still a further embodiment the location of the compliance information is a web page. In still a further embodiment the web page is stored in the sending computer arrangement. In still a further embodiment the compliance information comprises one or more additions or changes to a mutual fund prospectus. In still a further embodiment the second device stores the communicated consent. In still a further embodiment the sending computer arrangement comprises a server.

A further embodiment offers a computer-implemented method of providing an entity with compliance information stored in a compliance information database, the method comprising: identifying a specific compliance information record in the compliance information database to be provided; and directing a database management function to send a hyperlink to the entity pointing to the specific compliance information record.

Another embodiment offers a method of providing access to a compliance information database, the method comprising: under control of a first client system: sending an access instruction message; and under control of a server system: receiving the access instruction message from the first client system, identifying a specific compliance information record within the access instruction message, identifying a destination address within the access instruction message, creating a hyperlink pointing to the specific compliance information record in the compliance information database, and transmitting the hyperlink to the destination address. In a further embodiment the destination address is located at a second client system and the hyperlink is transmitted from the server system to the second client system via the Internet. In still a further embodiment the destination address is located at a second client system, the method further comprising: under control of the second client system: receiving the hyperlink from the server system, and accessing the server system via the hyperlink. In still a further embodiment the method further comprises: under control of the server system: detecting an access to the server system by the second client system via the hyperlink; determining whether or not the hyperlink is valid; and when the hyperlink is determined to be valid: identifying a specific compliance information record from the hyperlink, retrieving the specific compliance information record from the compliance information database, and causing the specific compliance information record to be displayed on the second client system.

Another embodiment offers a computer-implemented method of providing compliance information stored in a compliance information database, the method comprising: receiving an instruction that identifies a specific compliance information record in the compliance information database; creating a hyperlink pointing to the specific compliance information record; and sending the hyperlink to a destination address. In still a further embodiment the computer-implemented method further comprises receiving an access request to access the compliance information database via a received hyperlink; determining whether the received hyperlink is valid; and when the received hyperlink is determined to be valid, identifying a specific compliance information record from data in the received hyperlink and providing the specific compliance information record to a source of the received hyperlink.

Another embodiment offers a system for sharing compliance information data stored in a compliance information database, the system comprising: a first client system operative to: search the compliance information database, identify a specific compliance information record, identify a destination address, and send an access instruction message with respect to the specific compliance information record and destination; and a database server system operative to: receive the access instruction message, determine the specific compliance information record and destination address from the access instruction message, create a hyperlink pointing to the specific compliance information record in the compliance information database, and send the hyperlink to the destination address. In a further embodiment the first client system communicates with the database server system over the Internet. In still a further embodiment the first client system communicates with the database server system over an intranet.

Another embodiment offers a computer program product comprising: a computer-readable medium; and computer program instructions on the computer-readable medium, wherein the computer program instructions, when executed by a computer, direct the computer to perform a method of sharing compliance information data stored in a compliance information database, the method comprising: receiving an access instruction, identifying a specific compliance information record and a destination address in the access instruction, creating a hyperlink pointing to the specific compliance information record, and sending the hyperlink to the destination address. In a further embodiment the method further comprises at least one of: receiving the access instruction over the Internet; and sending the hyperlink over the Internet.

Another embodiment offers a system for sharing compliance information data stored in a compliance information database, the system comprising: a database server system operative to: receive an access instruction message; determine a specific compliance information record and destination address from the access instruction message; create a hyperlink pointing to the specific compliance information record in the compliance information database; and send the hyperlink to the destination address. In a further embodiment a first client system sends the access instruction message to the database server system over the Internet. In still a further embodiment the first client system sends the access instruction message to the database server system over an intranet.

Another embodiment offers a method of obtaining consent for electronic delivery of compliance information, the method comprising: (a) identifying a specific compliance information record in the compliance information database to be provided; and (b) directing a database management function to send a hyperlink to the entity pointing to the specific compliance information record.

The foregoing and other objects, aspects, features, and advantages of the invention will become more apparent from the following description and from the claims.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

Figure 1A:
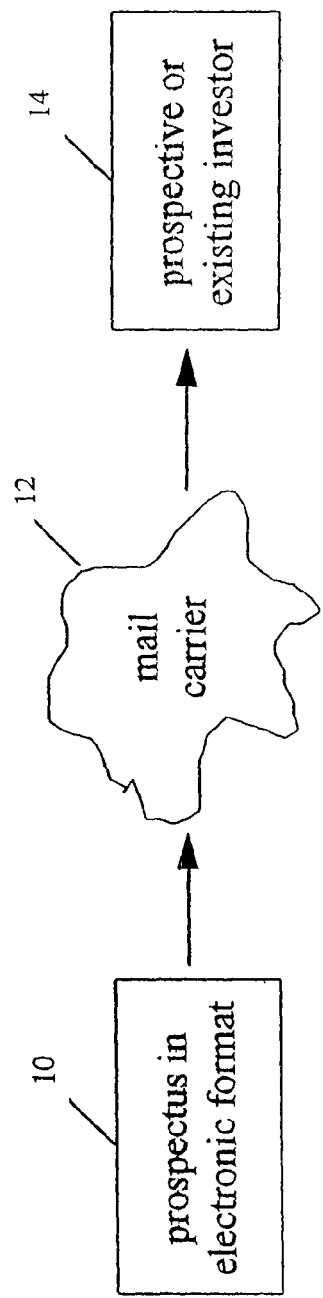
FIG. 1A is a diagram of the physical delivery of compliance information in computer-readable format to an individual.

Referring to FIG. 1A, a computer-readable storage device 10 is sent via a mail carrier service 12 to an individual 14. As an alternative to the mail carrier service 12, the individual 14 could directly receive the device 10 by in-person hand delivery. The device 10 can be any computer-readable data storage unit such as a computer diskette, a CD ROM, or a flash memory card. In the disclosed embodiment, the device 10 is a 3.5 inch computer diskette. Whatever the form the device 10 takes, it must contain at least compliance information (as defined above) in a format that is readable by a computer. In the disclosed embodiment, the device 10 stores a mutual fund prospectus. In addition to the compliance information, the device 10 also contains computer-executable instructions (software) for causing the computer to prompt the individual 14 for consent to the computer-aided delivery of additional compliance information to the individual 14 and for causing the computer to forward the consent to another computer. The mail carrier service 12 can be any of a variety of services that physically delivery packages and letters from one location to another including the U.S. Postal Service, United Parcel Service, or Federal Express. As mentioned previously, the delivery could be accomplished in person. In the disclosed embodiment, the individual 14 is a prospective or existing investor in, for example, a mutual fund.

Figure 1B:
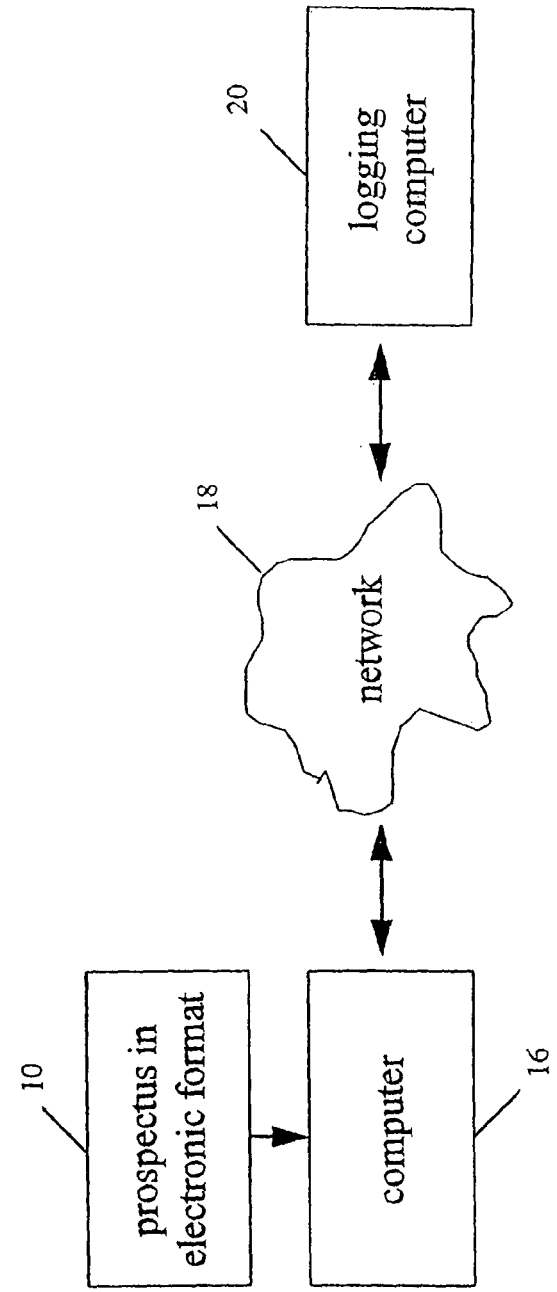
FIG. 1B is a diagram showing access of the compliance information by a computer operated by the individual and showing consent being provided electronically from the individual's computer to another computer such as a server.

Referring to FIG. 1B, with the device 10 in hand, the individual 14 can load it into a computer 16. The computer 16 will read the compliance information stored on the device 10 and display it to the individual 14. While it is possible for the computer 16 to use any of a variety of text editors, word processors, browsers, or other software to display the compliance information on the device 10 to the individual, in the disclosed embodiment, the computer 16 uses a "micro browser" stored on the device 10 along with the compliance information. The micro browser allows the individual at the computer 16 to review, search, etc. the compliance information. The micro browser can provide a variety of useful features to the individual 14 reviewing the compliance information including hypertext links to other sections of the mutual fund prospectus and/or to sites on the World Wide Web. In addition to the micro browser, or as part of the micro browser software, software on the device 10 is loaded into the computer 16 and executes on the computer 16 to prompt the individual 14 for his or her consent to the computer-aided delivery of additional compliance information or for his or her consent to a computer notification of the existence of additional compliance information. Once the individual 14 responds to the prompt and indicates his or her consent, the software causes the computer 16 to communicate that consent electronically over a computer communications link 18 (e.g., a computer network such as the Internet, the telephone system, etc.) to another computer 20. The computer communications link 18 between the individual's computer 16 and the other computer 20 is depicted as a "cloud" in FIG. 1B to indicate that it can be any of a variety of mediums over which two computers can or could transfer data. In the disclosed embodiment, the other computer 20 is a server that receives and logs the consent sent from the individual's computer 16. The other computer 20 can be maintained by, for example, the issuer of the mutual fund whose prospectus is stored by the device 10.

Some additional software features are as follows. In addition to the micro browser, or as part of the micro browser software, software on the device 10 is loaded into the computer 16 and executes on the computer 16 to provide a "forms wizard" feature to the individual 14 to aid in the completion of the various forms required to purchase the particular financial product(s) described by the compliance information on the diskette 10. Enrollment forms for many investment products are complex, and the forms wizard feature allows the individual 14 to complete such forms accurately and completely. Other software can be provided to allow the individual 14 to view various illustrations of quantitative scenarios. For example, the software can provide, or allow the downloading and self-extraction of files that provide, the individual 14 with the ability to enter his or her age and income and tax information such that the individual can make a determination based on the illustrations about whether a particular investment is appropriate or not.

Getting back to the consent that the individual provides, the scope of the consent requested of the individual 14 can vary. Depending on the type of compliance information (e.g., one or more mutual fund prospectuses, one or more prospectuses for one or more variable life insurance products, prospectuses for some collection of mutual funds whether all under the same fund family or not, etc.) stored by the device 10, the issuer of the particular investment vehicle described by the compliance information, and/or other factors, the individual may be requested for his or her consent to a wide range of things such as the consent to the computer-aided delivery of all compliance information required by a particular issuer, the consent to the computer-aided delivery of all "sticker" updates to the particular mutual fund prospectus that came stored on the diskette 10, or the consent to just one annual report related to the particular mutual fund prospectus on the diskette 10. Also, the scope of the consent can be broad enough to cover the computer-aided delivery of compliance information from more than one source or issuer.

Whatever the specific consent requested and given and then communicated to the other computer 20, the individual 14 will then sometime in the future receive by electronic delivery the additional compliance information. This delivery can be from the other computer 20 or some other computer that receives the consent from the other computer 20 (or is otherwise provided with the consent). In the disclosed embodiment, the additional compliance information is either a sticker to the mutual find prospectus on the diskette 10 or a notification indicating the existence and location of the sticker. The sticker can be sent from the other computer 20 to the individual's computer 16 as a file attachment to an email message. The notification can be sent from the other computer 20 to the individual's computer 16 as an email message having the address (Universal Resource Locator or URL) of a site on the World Wide Web where the sticker is posted, and this email message can also include a note to the individual 14 that he or she should view the sticker by a certain date.

Thus, in accordance with at least one aspect of the invention, the physical delivery of the diskette 10 to the individual 14 is used as a mechanism to obtain consent from the individual 14 for future electronic delivery of at least some additional compliance information.

The device 10 itself is an aspect of the invention. The device 10, whatever form it takes (e.g., a 3.5 inch computer diskette), includes the compliance information and the software necessary to at least obtain consent from the individual 14 via the computer 16 and then communicate the obtained consent to the other computer 20. The software on the device 10 preferably also includes the micro browser that can be executed on the individual's computer 16 to cause it at least to display the compliance information and preferably also the additional compliance information after that is received at the individual's computer 16 pursuant to the consent given by the individual 14. The methods of making computer-readable storage devices, such as 3.5 inch computer diskettes, are well known and thus are not described herein. Also, the technology to store software and data generally on such devices is available and thus is not described herein.

Figure 1C:
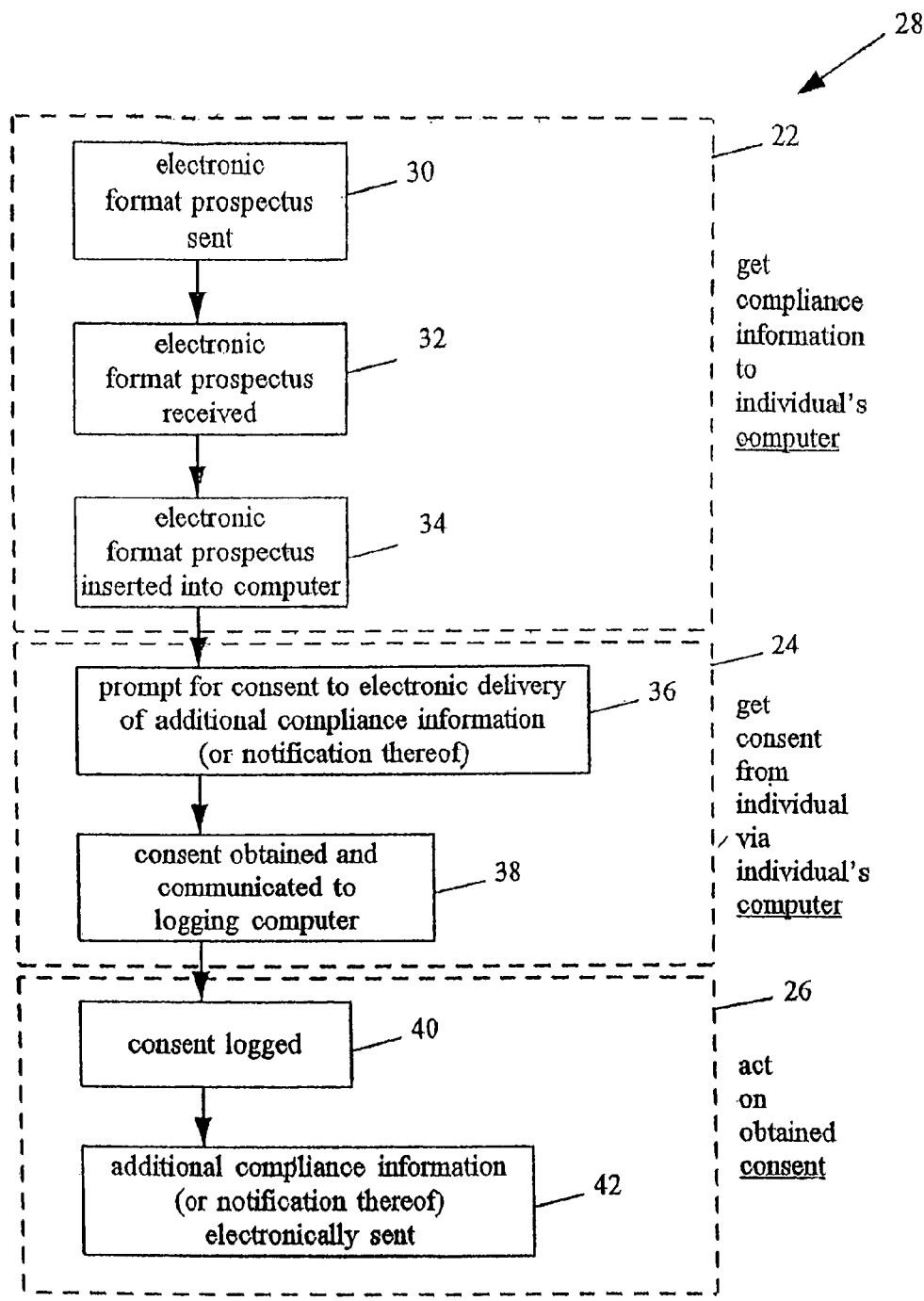
FIG. 1C is a flowchart of steps involved in obtaining consent from the individual using the structures of FIGS. 1A and 1B.

Referring to FIG. 1C, at least one aspect of the invention relates to a method 28 having the general steps of getting compliance information to the individual's computer 16 (step 22), getting the individual 14 to consent to the computer-aided delivery of additional compliance information (step 24), and acting on that consent once given (step 26). More particularly, in the disclosed embodiment, the method 28 involves physically sending the diskette 10 to the prospective or existing investor 14 (step 30) which is received by the individual 14 (step 32) and inserted into his or her computer 16 (step 34). In an alternative embodiment, the individual 14 does not receive the compliance information and/or software stored on a physical device 10 but instead uses his or her computer 16 to download the compliance information and/or software from a source. The source in the alternative embodiment can be the other computer 20 or a different computer such as a server on the Internet. Regardless of the manner in which the compliance information and/or software gets to the individual's computer 16, the individual 14 is prompted by his or her computer 16 to consent to the computer-aided delivery of additional compliance information or to consent to the computer-aided delivery of a notification of the additional compliance information (step 36). The individual 14 then indicates his or her consent by, for example, using a mouse of the computer 16 to click on an OK box displayed on a display of the computer 16, and the consent is communicated to the logging computer 20 (step 38). The logging computer 20 stores the consent received from the individual's computer 16 (step 40), and the additional compliance information or notification thereof that the individual 14 agreed to accept electronically is then immediately or later sent to the individual's computer 16 (step 42).

Figure 2:
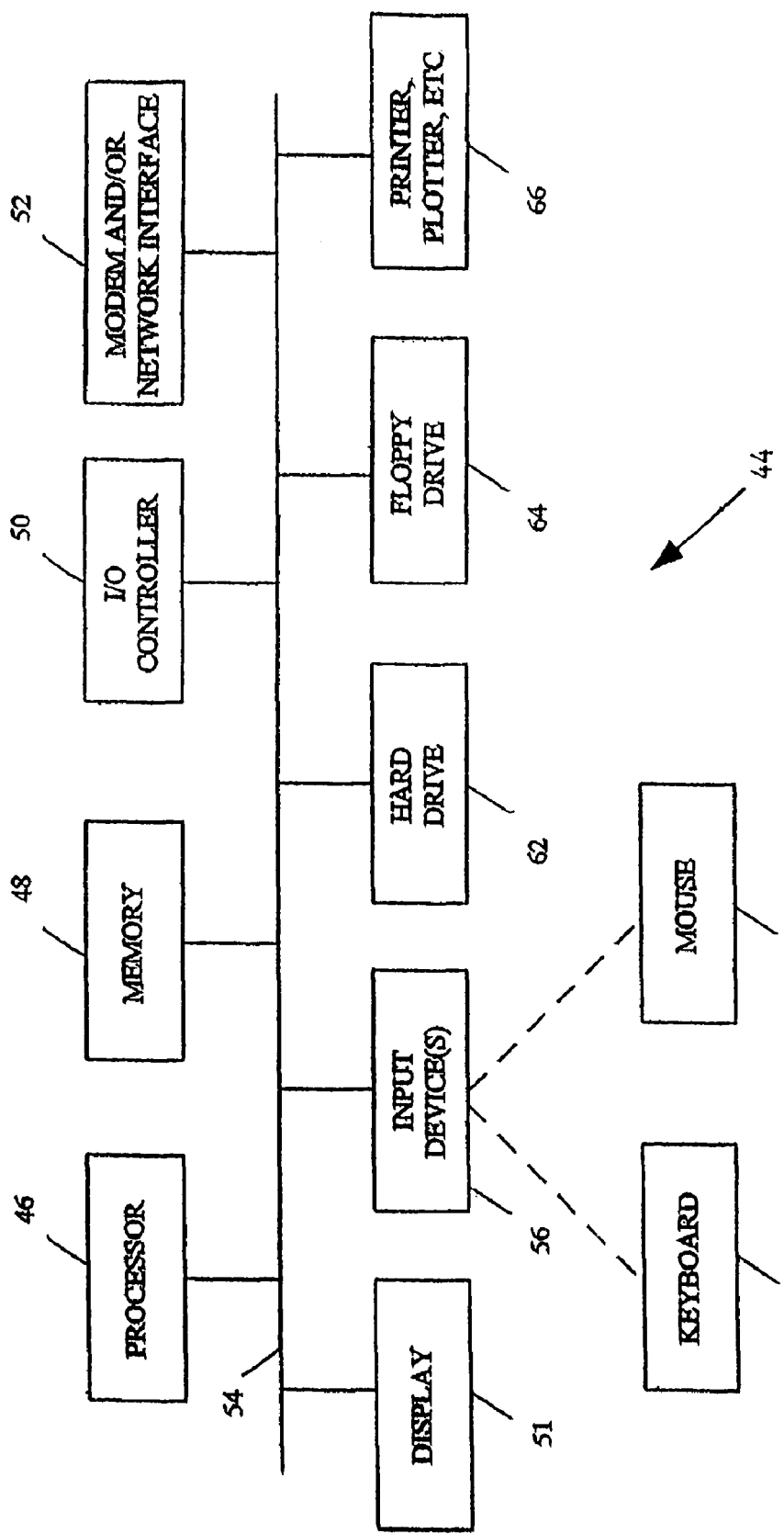
FIG. 2 is a block diagram of a general purpose computer for use with the invention.

The various computers used in the invention (e.g., the individual's computer 16 and the logging computer 20) can be general purpose computers. Referring to FIG. 2, at least the basic components of a general purpose computer 44 typically include a central processor 46, a main memory unit 48 for storing software and/or data, an input/output (I/O) controller 50, a display device 51, a communications device 52 such as a modem or a network interface card, and a data bus 54 coupling these components to allow communication therebetween. The memory 48 generally will include random access memory (RAM) and read only memory (ROM) chips. The computer 44 typically also has one or more input devices 56 such as a keyboard 58 and a mouse 60. The computer 44 typically also has a hard drive 62 with hard disks therein and a floppy drive 64 for receiving floppy disks such as the 3.5 inch diskette 10. Other devices also can be part of the computer 44 including output devices 66 (e.g., printer or plotter) and/or optical disk drives for receiving and reading digital data on a CD-ROM. In the disclosed embodiment, one or more computer programs define the operational capabilities of the computer 44. These software programs can be loaded onto the hard drive 62 and/or into the memory 48 of the computer 44 via the floppy drive 64. The compliance data stored on the diskette 10 also can be loaded into the computer 44 via the floppy drive 64.

In one embodiment, at least the executable version of the software (e.g., the micro browser) is made to reside on the hard drive 62, and it is caused to execute by the individual 14 double-clicking an appropriate icon on the display 51 using the mouse 60. In general, the controlling software and all of the data utilized by the software are transferred from the diskette 10 and reside on one or more of the computer's storage mediums such as the hard drive 62.

The general purpose computer 44 can be any computer or workstation (client or server) such as a PC or PC-compatible machine, an Apple Macintosh, a Sun workstation, etc. The particular type of computer or workstation is not central to the invention. In fact, the invention can be implemented in a variety of ways including an all-hardware embodiment in which dedicated electronic circuits are designed to perform all of the functionality which the programmed computer can perform. The preferred embodiment of the invention is an implementation in software for execution on one or more general purpose computers such as PCs running the Microsoft Windows or Microsoft Windows 95 operating system.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A system for sharing compliance information data stored in a compliance information database, the system comprising:
    a first client system operative to:
        search the compliance information database,
        identify a specific compliance information record associated with one or more items of compliance information, each item of the one or more items of compliance information being subject to a legal requirement specifying obtainment of consent to delivery of the item in electronic form,
        identify a destination address, and
        send an access instruction message with respect to the specific compliance information record and destination address; and
    a database server system operative to:
        receive the access instruction message,
        determine the specific compliance information record and destination address from the access instruction message,
        create a hyperlink pointing to the specific compliance information record in the compliance information database,
        obtain consent to electronic delivery of the one or more items of compliance information associated with the specific compliance information record, the obtainment of consent being unrelated to security authorization or identification, and
        upon obtaining consent, send the hyperlink to the destination address.

2. The system of claim 1, wherein the first client system communicates with the database server system over the Internet.

3. The system of claim 1, wherein the first client system communicates with the database server system over an intranet.

* * * * *